(12) United States Patent
Klooster et al.

(10) Patent No.: US 11,266,080 B2
(45) Date of Patent: Mar. 8, 2022

(54) METHOD AND SEEDER FOR SOWING AN INDIVIDUAL SEED IN A SEED LOCATION

(71) Applicant: SeQso Exploitatie B.V., Apeldoorn (NL)

(72) Inventors: Meindert Willem Klooster, Enkhuizen (NL); Jan Pieter Poppe, Arnemuiden (NL); Peter Leo Kok, Apeldoorn (NL)

(73) Assignee: SeQso Exploitatie B.V., Apeldoorn (NL)

( * ) Notice: Subject to any disclaimer, the term of this patent is extended or adjusted under 35 U.S.C. 154(b) by 274 days.

(21) Appl. No.: 16/318,875

(22) PCT Filed: Jul. 19, 2017

(86) PCT No.: PCT/NL2017/050486
§ 371 (c)(1),
(2) Date: Jan. 18, 2019

(87) PCT Pub. No.: WO2018/016952
PCT Pub. Date: Jan. 25, 2018

(65) Prior Publication Data
US 2019/0141909 A1      May 16, 2019

(30) Foreign Application Priority Data

Jul. 19, 2016   (NL) ..................................... 2017192

(51) Int. Cl.
*A01G 9/08* (2006.01)
*B07C 5/342* (2006.01)
*A01C 1/04* (2006.01)

(52) U.S. Cl.
CPC ............... *A01G 9/085* (2013.01); *A01G 9/08* (2013.01); *A01C 2001/048* (2013.01); *B07C 5/3422* (2013.01); *B07C 5/3425* (2013.01)

(58) Field of Classification Search
CPC .................................. A01G 9/08; A01G 9/085
USPC .......................................... 47/1.01 F, 58.1 SE
See application file for complete search history.

(56) References Cited

U.S. PATENT DOCUMENTS

| 4,010,778 | A |   | 3/1977 | Aggen |   |
|---|---|---|---|---|---|
| 4,046,285 | A | * | 9/1977 | Wendt | A01C 7/04 221/157 |
| 4,718,363 | A | * | 1/1988 | Williames | A01G 9/085 111/179 |

(Continued)

FOREIGN PATENT DOCUMENTS

| EP | 1661631 A1 | 5/2006 |
|---|---|---|
| WO | 2005011358 A1 | 2/2005 |

*Primary Examiner* — David J Parsley
(74) *Attorney, Agent, or Firm* — The Webb Law Firm

(57) ABSTRACT

A method for sowing an individual seed in a seed location and to a seeder therefor. The method includes arranging a seed on a surface adjacent to an opening that leads to a guide channel that extends to the seed location; flushing the seed from the surface into the opening by directing a fluid over the surface in the direction of the opening; and guiding the seed to a seed location by the guide channel. The seeder has at least one opening that leads to a guide channel that extends to a seed location; a surface that is configured to be arranged adjacent to the at least one opening; and a selectively operable fluid supply for each opening, each fluid supply having at least one nozzle that is arranged for directing fluid over the surface in the direction of the opening.

21 Claims, 11 Drawing Sheets

(56) References Cited

U.S. PATENT DOCUMENTS

| | | |
|---|---|---|
| 7,111,740 B2 | 9/2006 | Ogawa et al. |
| 7,490,565 B2 | 2/2009 | Holly |
| 8,504,204 B2 * | 8/2013 | Owens, Jr. ............. B25J 9/1687 700/259 |
| 9,661,805 B1 * | 5/2017 | Conrad ................ G01N 21/553 |

* cited by examiner

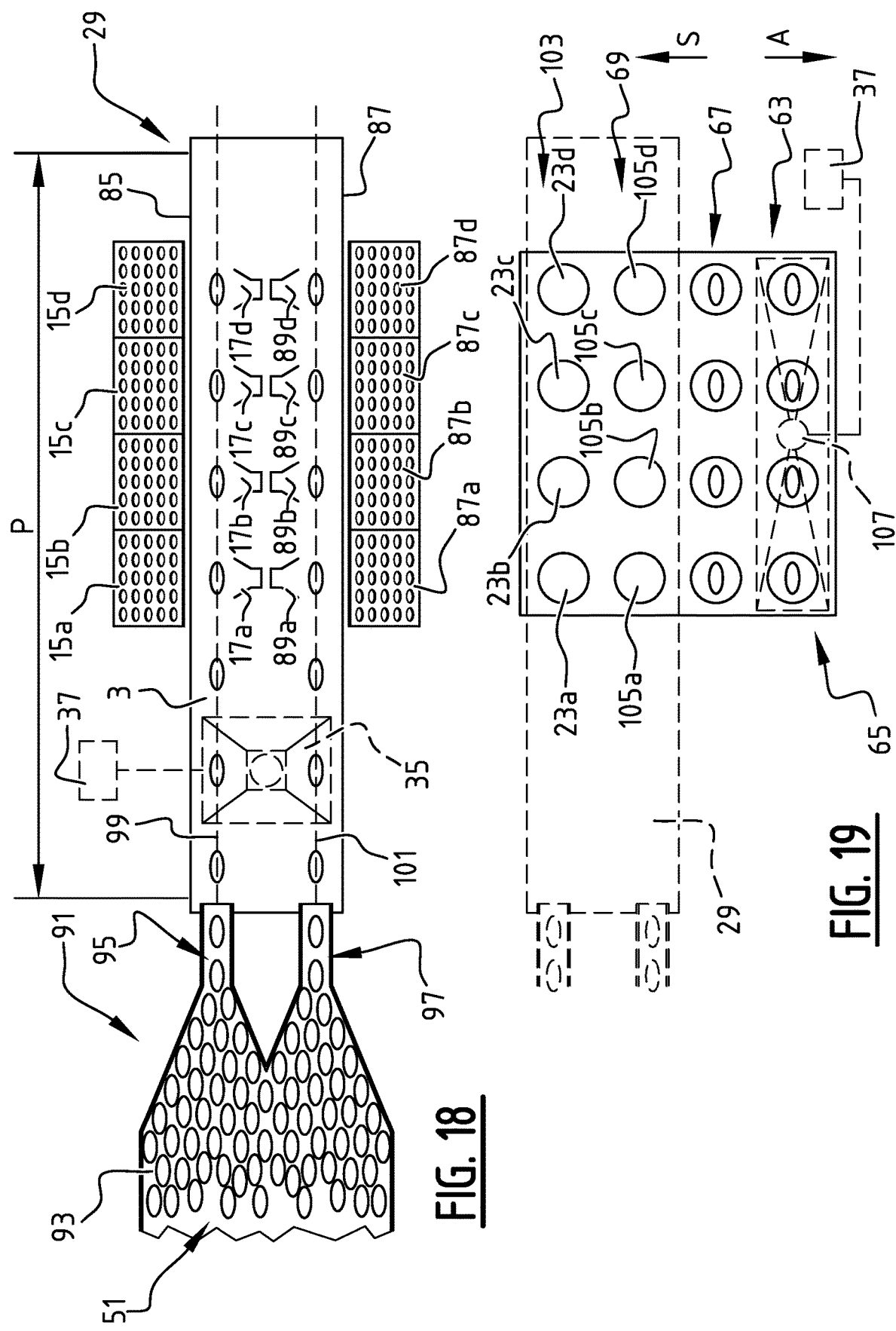

METHOD AND SEEDER FOR SOWING AN INDIVIDUAL SEED IN A SEED LOCATION

CROSS-REFERENCE TO RELATED APPLICATIONS

This application is the United States national phase of International Application No. PCT/NL2017/050486 filed Jul. 19, 2017, and claims priority to Dutch Patent Application No. 2017192 filed Jul. 19, 2016, the disclosures of which are hereby incorporated in their entirety by reference.

BACKGROUND OF THE INVENTION

The present invention relates to a method for sowing an individual seed in a seed location and to a seeder therefor.

For seedling production, individual seeds are sown in a seed location. The seed location is generally a respective compartment of a seed tray having a plurality of tray compartments, each filled with a growth substrate such as soil. One seed is to be sown in each tray compartment.

It is known to sow individual seeds in a respective compartment of a seed tray by hand. Although sowing by hand allows for accurate sowing of individual seeds, it is laborious and thus costly.

It is also known to sow individual seeds in respective tray compartment of a seed tray by mechanised sowing methods. In known mechanised methods for sowing an individual seed in a tray compartment, an individual seed is arranged adjacent to an opening of a tray compartment while being held by vacuum on the tip of a needle of a so-called needle seeder. The tip of the needle of such needle seeder is provided with an air opening against which the individual seed is held by the vacuum. Once arranged adjacent to the opening of the tray compartment, the seed is released from the tip of the needle, generally by releasing the vacuum and blowing the seed from the tip of the needle into the tray compartment by blowing air through the air opening after releasing the vacuum. It is also known to arrange an individual seed adjacent to an opening of a tray compartment while being held by vacuum on the surface of a drum of a so-called drum seeder. The surface of the drum of such drum seeder is provided with an air opening against which the individual seed is held by the vacuum. Once arranged adjacent to the opening of the tray compartment, the seed is released from the surface of the drum, generally by releasing the vacuum and blowing the seed away from the surface into the tray compartment by blowing air through the air opening against which the seed was held after releasing the vacuum.

Although sowing by means of these known mechanised methods is less laborious relative to sowing by hand, these known mechanised methods have a number of drawbacks.

These known mechanised methods for instance require accurate placement of the individual seeds on respectively the air opening on the tip of the needle and the air opening on the surface of the drum. In practice accurate placement of the individual seeds on the respective air openings is unreliable, resulting in compartments of a seed tray being left empty.

Furthermore, for reliable holding a seed on respectively the tip of the needle and the surface of the drum, these known mechanised methods require that the size and shape of the air opening and of the surface around the air opening against which the seed is held, is adapted to the size and shape of the seeds to be sown. The latter requires changing the size and/or shape of the air opening and of the surface around the air opening when another type of seed is to be sown, for instance by exchanging the needle or drum that has an air opening having a size and shape adapted to a first type of seed, with a needle or drum having an air opening of a different size and/or shape adapted to a second type of seed.

A known solution to these drawbacks is to pellet individual seeds. By pelleting individual seeds, the size and shape of individual seeds can be changed, and thus can be optimized for accurate placement of the individual pelleted seeds on the respective openings of the needle or drum. Furthermore, different types of seeds having different shape and size can be provided with a uniform size and shape, such that a needle or a drum having air openings that are adapted to the uniform size and shape of the pelleted seeds, can be used to sow different types of seed without replacement of the needle or drum. Although providing a solution to the above drawbacks, pelleting of seeds itself has the drawback that it is costly.

SUMMARY OF THE INVENTION

One of the objects of the present invention is to address at least one of the drawbacks of the known methods for sowing an individual seed in a seed location.

The present invention provides a method for sowing an individual seed in a seed location, comprising:
- arranging a seed on a surface adjacent to an opening that leads to a guide channel that extends to the seed location;
- flushing the seed from the surface into the opening by directing a fluid over the surface in the direction of the opening;
- guiding the seed that is flushed into the opening to a seed location by means of the guide channel.

The method according to the invention does not require an air opening in the surface for holding on the seed by vacuum and for blowing the seed into the seed location, such as in known methods. By flushing the seed into an opening that leads to a guide channel that extends to the seed location and by guiding the seed that is flushed into the opening to a seed location by means of the guide channel, the orientation of the surface is independent from the seed location, and can be such that it is not required to hold the seed onto the surface against an air opening by means of vacuum. Furthermore, by flushing, according to the invention, the seed from the surface into the opening by directing a fluid over the surface in the direction of the opening, there is no requirement for an air opening in the surface for blowing the seed into the opening. Requiring no air opening in the surface for holding on the seed by vacuum and for transporting the seed into the seed location, has the advantage over the known methods that placement of the seed on the surface requires less accuracy. As long as the seed is in the path of the fluid that is directed over the surface, the seed is flushed into the opening. In particular, the seed is flushed over the surface in the direction of the opening by directing the fluid over the surface in the direction of the opening, more in particular by using positive pressure. Furthermore, the surface can be shaped independent from the size and shape of the seed, and thus it is not required to adapt the surface to the size and shape of the seeds to be sown. This allows seeds of different size and shape to be sown by means of the method according to the invention without exchanging the surface. There is no need to pallet the seeds for applying the method according to the invention. However, if pelleting of the seeds is required for other reasons than providing the seeds with a uniform size and shape, the method according to the invention can be applied for sowing pelleted seed and bare seeds without exchanging the surface.

The fluid that according to the present invention is directed over the surface in the direction of the opening for flushing the seed from the surface into the opening is a gas, a liquid, or a combination thereof, for instance a gas having dispersed therein drops of a liquid. Preferably, the fluid is air. By directing air over the surface in the direction of the opening, the seed is blown from the surface into the opening.

Preferably the surface is a flat surface. This as opposed to the curved surface of a drum of the so-called drum seeder according to the prior art as discussed herein above. The feature that the surface is flat has the advantage of reduced influence of the surface on the seed while being arranged on the surface and while being flushed from the surface relative to a surface that is not flat, as well as reduced influence of the surface on the fluid that is directed over the surface. Preferably the surface is a substantially horizontal surface.

In a preferred embodiment of the method according to the invention, the surface is a conveyor surface, the seed is conveyed along the opening on the conveyor surface, and the seed is flushed into the opening when the seed is adjacent to the opening. The features of this embodiment allow the seed to be placed on the conveyor surface at a location different from the location of the opening and subsequently convey the seed on the conveyor surface to the location of the opening in order to arrange the seed adjacent to the opening. Preferably, the conveyor surface with arranged thereon the seed is conveyed along the opening. This provides control over the location and speed of the seed while its being conveyed from the location where it is arranged on the conveyor surface and the location of the opening. Preferably, the seed is conveyed along the opening on the conveyor surface in a conveying direction; and the fluid is directed transverse to the conveying direction.

Preferably, the conveyor surface is a surface of a linear conveyor. More preferably the surface of a conveyor belt. Alternatively, the conveyor surface is a surface of a rotary surface, for instance a surface of a rotary table.

In an advantageous embodiment of the method according to the invention wherein the surface is a conveyor surface, the opening in which the seed is flushed is a selected one of a plurality of openings arranged along the conveyor surface, wherein each opening leads to a respective guide channel that extends to a respective seed location. In particular, the seed is conveyed on the conveyor surface along the plurality of openings in a conveying direction, and the plurality of openings is arranged in a row that extends parallel to the conveying direction.

In a further advantageous embodiment of the method according to the invention the seed that is flushed into the opening is a selected one of a plurality of seeds. In a preferred embodiment thereof, the plurality of seeds is arranged in a row of seeds on the surface and conveyed along the opening on or over the surface in a direction parallel to the row. In an advantageous embodiment of thereof the seeds are arranged in a row of individual seeds on the surface by moving the surface with a conveying speed, and arranging a batch of seeds on a shaker conveyor that debouches on the surface, wherein the shaker conveyor is configured to channel the batch of seeds into a flow of seeds having a flow speed that is lower than the conveying speed of the surface. Preferably, the number of seeds in the batch of seeds that is arranged on the shaker conveyor is counted.

In an advantageous embodiment of the method according to the invention described herein above wherein the seed that is flushed into the opening is a selected one of a plurality of seeds, the method further comprises: determining a selection characteristic of each of the plurality of seeds that is arranged on the surface; and selecting the seed to be flushed into the opening at least based on the determined selection characteristic of the seed. According to the invention a seed can be selected on the basis of one or more than one determined selection characteristic. Selection characteristics can include any internal or external morphological or physiological characteristic, such as size, shape, colour, chlorophyll content, water content, etc. In an advantageous embodiment thereof the selection characteristic of each of the plurality of seeds is determined using at least one selection sensor. Preferably, the at least one selection sensor includes a camera, and the selection characteristic is determined by analysing images of the seed on the surface obtained by means of the camera. The choice of selection sensor(s) is made based on the selection characteristic(s) used for the selection. A camera is for instance particularly suitable for determining external morphological or physiological characteristics such as size, shape, and colour of a seed. Examples of other selection sensors suitable for determining internal morphological or physiological characteristics are X-ray sensors and Terahertz sensors.

In a further advantage embodiment of the method according to the invention, the method comprises: determining the location of the seed on the surface, and flushing the seed from the surface into the opening when it is determined that the seed is adjacent to the opening. In an advantageous embodiment thereof the location of the seed on the surface is determined using at least one location sensor. Preferably, the at least one location sensor includes a camera, and the location of the seed on the surface is determined by analysing images of the seed on the surface obtained by means of the camera. A camera is particularly suitable for determining location of the seed on the surface. An example of other location sensors that may be used for determining the location of the seed on the surface includes an infrared sensor.

In an advantageous embodiment of the method according to the invention as described herein above wherein the location of the seed on the surface is determined, first the seed is arranged on the surface at a first location and subsequently the surface is moved along the opening so as to arrange the seed at a second location adjacent to the opening. After being arranged on the surface and before reaching the second location, the location of the seed on the surface is determined and associated with the location of the surface relative to the second location. When it is determined that the location of the surface that is associated with the seed is at the second location the seed is flushed from the surface into the opening.

In an advantageous embodiment of the method according to the invention the seed location is a tray compartment of a seed tray.

The present invention further relates to a seeder for sowing a seed in a seed location. In particular the present invention relates to a seeder configured for executing the method according to the invention, more in particular for executing at least one of the above described embodiments of the method according to the invention.

The seeder according to the invention comprises:
at least one opening that leads to a guide channel that extends to a seed location;
a surface that is configured to be arranged adjacent to at least one opening; and a selectively operable fluid supply for each opening, each fluid supply having at least one nozzle that is arranged for directing fluid supplied thereto over the surface in the direction of the opening.

The fluid supply is in particular selectively operable such that fluid is directed over the surface at a selected moment in time, in particular a moment in time wherein a seed that is to be flushed into the opening is adjacent to the opening.

The nozzle is in particular a positive pressure nozzle. The nozzle is in particular directed in the direction of the opening.

Preferably, the seeder further comprises a seed supply for arranging a seed on the surface.

Preferably, at least when arranged adjacent to the opening, the surface is substantially flat. Furthermore, preferably, at least when arranged adjacent to the opening, the surface is substantially horizontal.

In a preferred embodiment of the seeder according to the invention, the surface is a conveyor surface, the conveyor surface is configured to be moved along a path, and the at least one opening is arranged adjacent to the path of the conveyor surface. Preferably, the conveyor surface is configured to be conveyed along the opening. Preferably, the conveyor surface is configured to be moved along the path in a conveying direction, and the nozzle is arranged for directing the fluid supplied thereto over the surface transverse to the conveying direction.

Preferably, the conveyor surface is a surface of a linear conveyor. More preferably the conveyor surface is the surface of a conveyor belt. Alternatively, the conveyor surface is a surface of a rotary surface, for instance a surface of a rotary table.

In an advantageous embodiment of the seeder according to the invention wherein the surface is a conveyor surface, a plurality of openings is arranged along the path of the conveyor surface, wherein each opening leads to a respective guide channel that extends to a respective seed location. Preferably, the conveyor surface is configured to be moved along the path in a conveying direction, and the plurality of openings is arranged in at least one row that extends parallel to the conveying direction.

In a preferred embodiment of the seeder according to the invention wherein a plurality of openings is arranged along the path of the conveyor surface, the openings are arranged along opposite edges of the conveyor surface that are parallel to the path of the conveyor surface, wherein preferably the nozzles of the selectively operable fluid supplies associated with the openings are arranged above the conveyor surface in between the opposite edges.

In an advantageous embodiment of the seeder according to the invention, the seed supply comprises: a shaker conveyor that debouches on the conveyor surface, wherein the shaker conveyor is configured to channel a batch of seeds into a flow of seeds; and a seed distributor configured for batch wise distributing seeds to the shaker conveyor. The additional features of this advantageous embodiment are in particular advantageous in the above described embodiment of the seeder according to the invention that comprises the feature that the surface is a conveyor surface configured to be conveyed along the path thereof.

In an advantageous embodiment the shaker conveyor is configured to channel the batch of seeds into two flows of seeds debouching on opposite sides of the nozzles. The additional feature of this advantageous embodiment is in particular advantageous in combination with the embodiment of the seeder according to the invention wherein openings are arranged along opposite edges of the conveyor surface that are parallel to the path of the conveyor surface and wherein the nozzles of the selectively operable fluid supplies associated with the openings are arranged above the conveyor surface in between the opposite edges.

In a preferred embodiment of the seeder according to the invention wherein the seed supply comprises a shake conveyor, the seed supply comprises a seed counter arranged and configured for counting the number of seeds in the batch of seeds that is distributed to the shaker conveyor.

In an advantageous embodiment of the seeder according to the invention, the seed location is a tray compartment of a seed tray, and the seeder comprises a seed tray conveyor, preferably a linear conveyor, that is configured for arranging the tray compartment underneath an outlet of the guide channel.

BRIEF DESCRIPTION OF THE DRAWINGS

The accompanying drawings are used to illustrate present non-limitative preferred exemplary embodiments of the method and seeder of the present invention. The above stated and other advantages, features and objectives of the invention will become more apparent, and the invention better understood, from the following detailed description when read in combination with the accompanying drawings, in which:

FIG. 18 illustrates an embodiment of the method and seeder according to the invention that is an advantageous further development of the embodiment illustrated by FIGS. 12 to;

FIG. 19 shows a seed tray that is arranged underneath the conveyor belt of the embodiment shown in FIG. 18.

DESCRIPTION OF THE INVENTION

Figure 1:
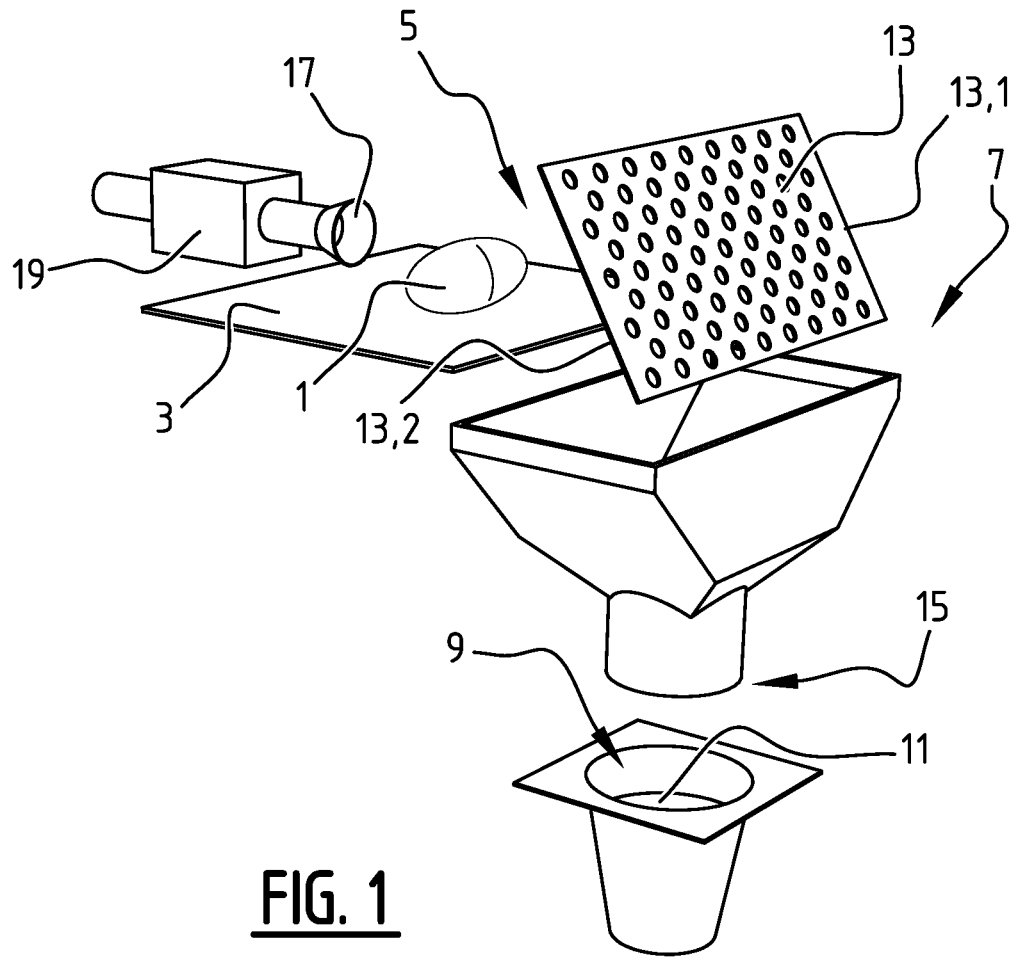
FIGS. 1 to 3 illustrate the general steps of embodiments of a method according to the invention as well as general components of embodiments of a seeder according to the invention.
Figures 2, 3, 4:
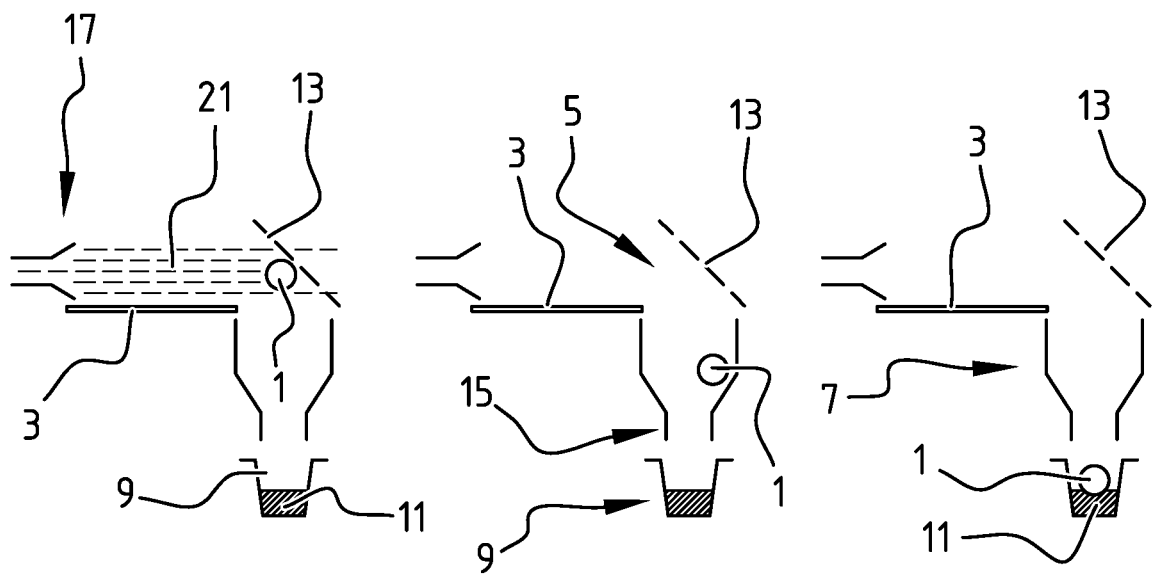
FIG. 4 shows the result of the method steps illustrated by FIGS. 1 to 3.

In FIGS. 1 to 3, general steps of a method according to the invention are shown as well as general components of a seeder according to the invention.

In FIG. 1 is shown that a seed 1 is arranged on a surface 3 adjacent to an opening 5 that leads to a guide channel 7 that extends to a seed location that in FIG. 1 is embodied by a tray compartment 9 of a seed tray. As shown, the tray compartment 9 holds a growth substrate 11. The surface 3 is a flat surface. Furthermore, the surface 3 is a substantially horizontal surface. The guide channel 7 is provided at its upper end with a perforated slanted guiding wall 13 on the side of the opening 5 opposite the side of the opening 5 where the surface is. Preferably side walls that serve as side borders of the opening 5 extend from opposite sides 13.1, 13.2 of the slanted wall 13 towards the surface 3. In FIG. 1 such side walls are not shown as they would partly obstruct the view on the seed 1.

The guide channel 7 has at its lower end an outlet 15. The guide channel 7 funnels towards the outlet 15. On the side of the surface 3 opposite the side where the opening 5 is arranged, a nozzle 17 is arranged that is connected to a fluid source (not shown) via a selectively operable valve 19. The fluid is preferably air and the fluid source preferably a source of compressed air.

In FIG. 2 is shown that the seed 1 is flushed from the surface 3 into the opening 5 by directing, using the nozzle 17, a fluid 21 over the surface 3 in the direction of the opening 5. The fluid 21 is supplied from the fluid supply to the nozzle 17 after opening the selectively operable valve 19. As shown in FIG. 2, the seed 1 is flushed against the perforated slanted wall 13. The fluid 21 exits through the perforations in the perforated slanted wall 13, such that the fluid 21 is not directed down into the guide channel 7.

As shown in FIG. 3, the seed 1 is guided by means of the guide channel 7 to the tray compartment 9. In particular, the seed 1 is directed by means of the perforated slanted wall 13 down into the guide channel 7, where the seed 1 is guided via the funnel-shaped part to the outlet 15 that has an outlet opening 23 under which outlet opening 23 the tray compartment 9 is arranged.

The result of the above steps is shown in FIG. 4; the seed 1 is sown in the seed location embodied by the tray compartment 9.

Figure 5:
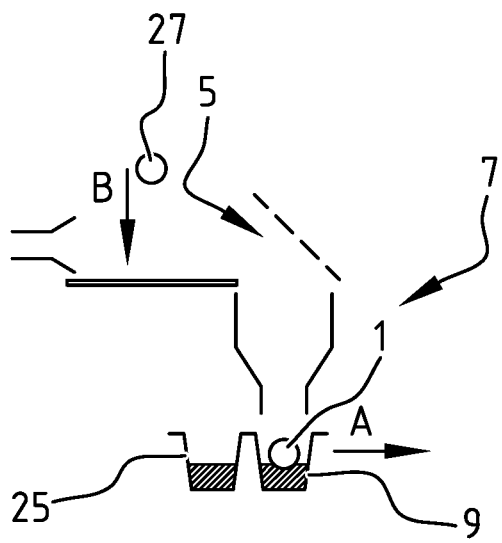
FIGS. 5 and 6 illustrate an embodiment of the method according to the invention in which the general steps shown in FIGS. 1 to 3 are used as well as an embodiment of the seeder according to the invention in which the general components of the seeder shown in FIGS. 1 to 3 are incorporated.
Figure 6:
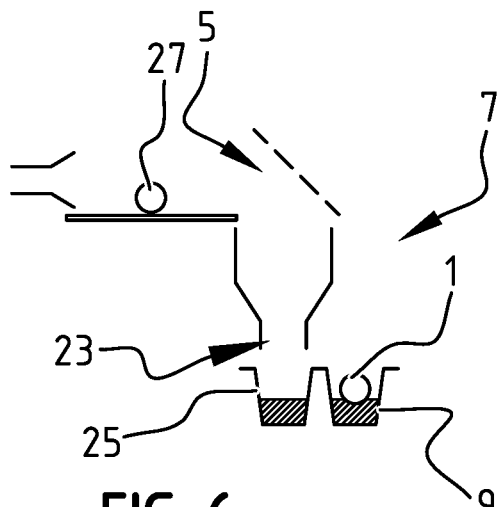

In FIGS. 5 and 6 an embodiment of the method according to the invention is shown in which the general steps shown in FIGS. 1 to 3 are used. FIGS. 5 and 6 also show an embodiment of a seeder according to the invention.

In particular is shown that after sowing the seed 1 into tray compartment 9 in accordance with the steps shown in FIGS. 1 to 3, the tray compartment 9 is moved in the direction of arrow A and a second tray compartment 25 that is attached thereto is arranged underneath the outlet opening 23 of the guide channel 7. Furthermore, a second seed 27 is arranged on the surface 3 adjacent to the opening 5 as schematically indicated by arrow B. Once the second seed 27 is arranged on the surface 3 and the second tray compartment 25 is arranged underneath the outlet opening 23, the second seed 27 can be sown in the second tray compartment 25 by executing the general steps illustrated in FIGS. 1 to 3. The above can be repeated with a third, fourth, fifth, ect. tray compartment and seed. Thus a seed can be sown in each of a row of tray compartments of a seed tray.

Figure 7:
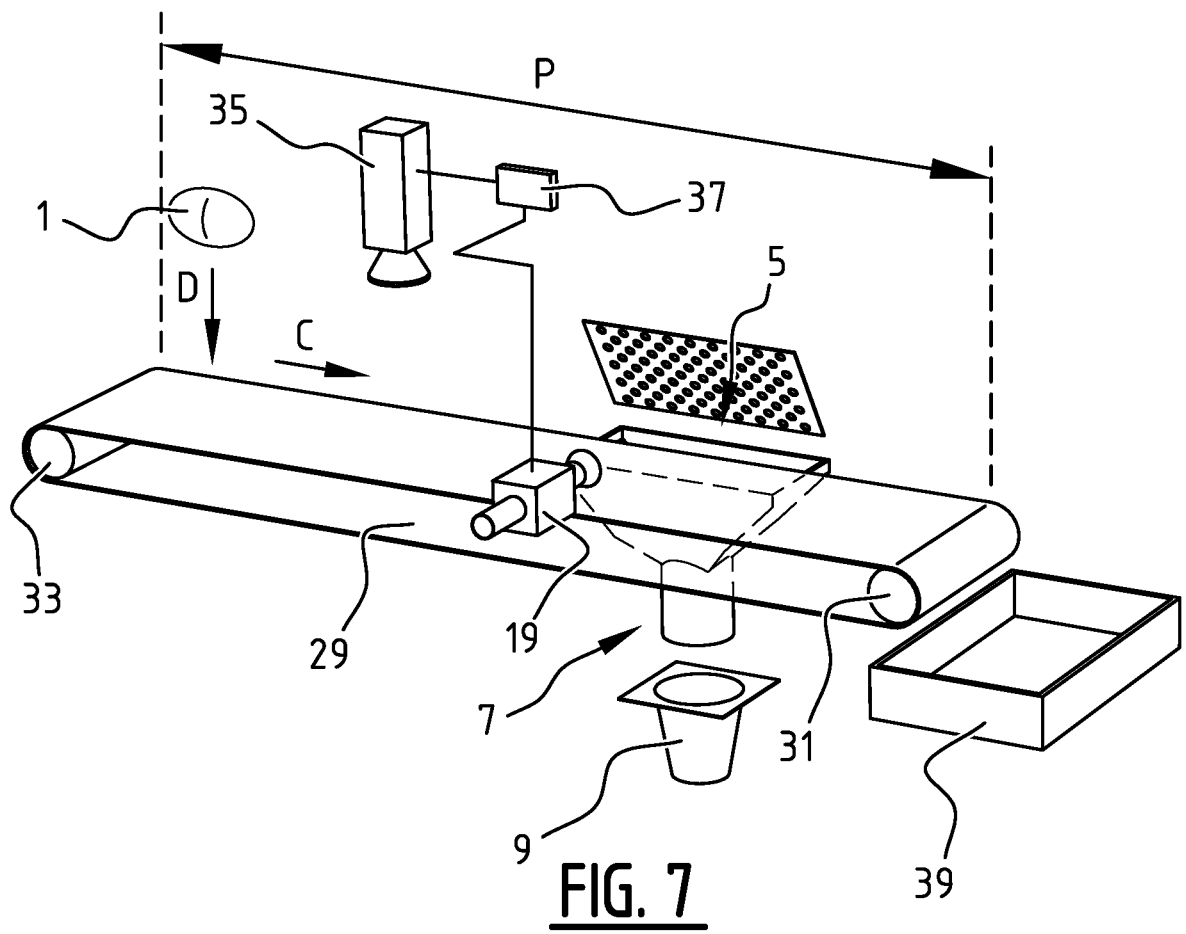
FIGS. 7 to 11 illustrate an embodiment of the method and seeder according to the invention that is an advantageous further development of the embodiment illustrated by FIGS. 5 and 6.
Figure 8:
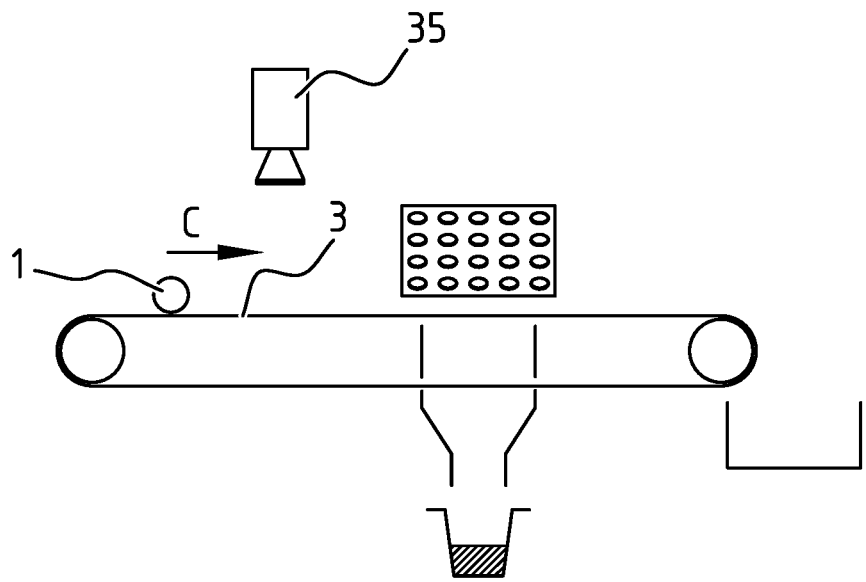
Figure 9:
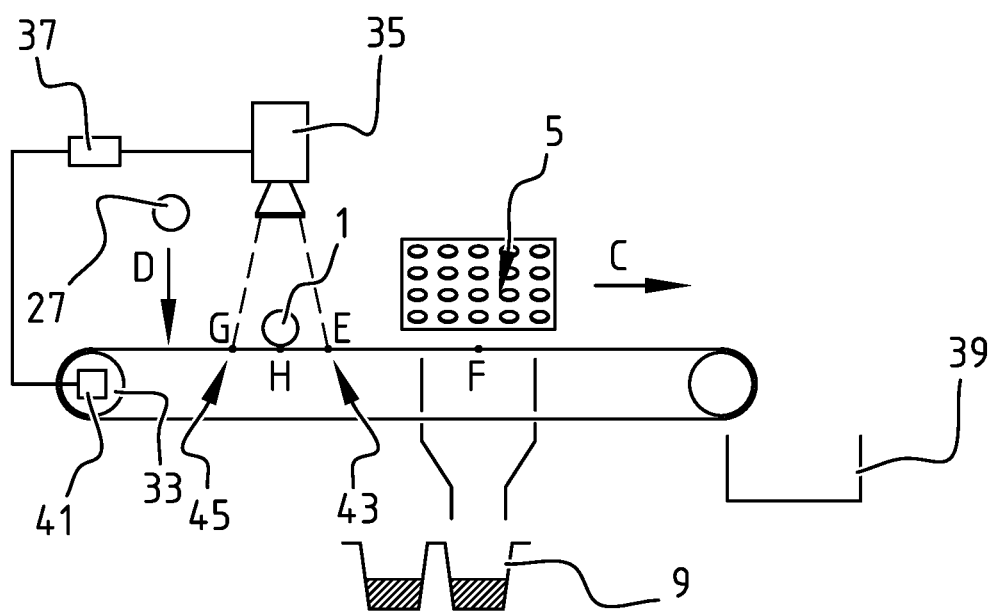

In FIGS. 7 to 11 an embodiment of the method and the seeder according to the invention is shown that is an advantageous further development of the embodiment illustrated by FIGS. 5 and 6. In FIG. 7 is shown that the surface 3 is a conveyor surface, in particular a surface of a conveyor belt 29. The conveyor belt 29 is led over two pulleys 31, 33 and driven such that the surface thereof moves in the direction of arrow C. When the conveyor belt 29 moves in the direction of arrow C, the conveyor surface 3 is moved along a path P. Along path P is arranged a camera 35 that is arranged above the surface of the conveyor belt 29 such that the surface of the conveyor belt 29 is in its view. Along path P is further arranged opening 5 that as shown in FIG. 1 leads to the guide channel 7 that extends to a seed location that is embodied by a tray compartment 9 of a seed tray. The camera 35 is connected to a controller 37. The controller 37 is furthermore connected to the selectively operable valve 19. At the end of path P a receptacle 39 is arranged. As schematically illustrated in FIG. 7 by means of arrow D, seed 1 is placed on the conveyor surface 3 at a location near the start of path P. As shown in FIG. 8, since the surface of the conveyor belt 29 moves in the direction of arrow C, once the seed 1 is placed on the conveyor surface 3, the seed 1 and the conveyor surface 3 are moved together in the direction of arrow C along the path P. As shown in FIG. 9 seed 1 is thus conveyed along the camera 35. It is also shown that while seed 1 is conveyed along the camera 35, a second seed 27 is placed on the conveyor surface 3 as schematically illustrated by means of arrow D.

Figure 10:
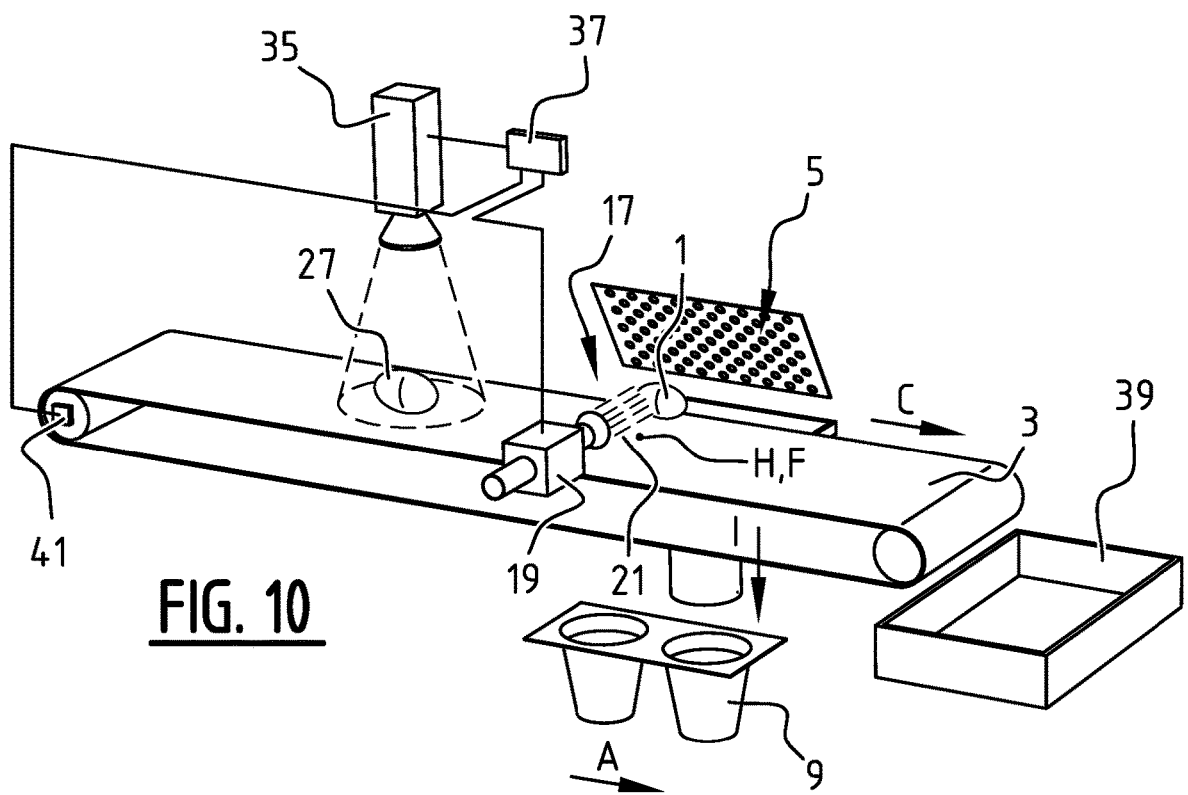

The camera 35 periodically sends images of the surface of the conveyor belt 29 to the controller 37. The controller 37 is provided with a processor that is configured to analyse the images received from the camera 35. The processor is configured to detect the seed 1 on the images while seed 1 is conveyed along the camera 35, and to determine a selection characteristic of the seed 1, for instance the shape of the seed 1. The processor is provided with selection criteria for the selection characteristic and is configured to select the seed for flushing into the opening 15 in case the determined selection characteristic meets the selection criteria. In the present case it is determined by the processor that seed 1 meets the selection criteria, and thus seed 1 is selected to be flushed into the opening 5 when seed 1 is arranged adjacent to the opening 5. The processor of the controller 37 is furthermore configured to determine the location of the seed 1 relative to the conveyor surface 3 based on the analyses of the images received from the camera 35 and to associate the determined location of the seed 1 relative to the conveyor surface 3 with the location of the conveyor surface 3 relative to the location of the opening 5. In the present embodiment, the controller 37 is connected to an angular rotation sensor 41 that is configured to sense angular rotation of pulley 33. The processor of the controller 37 is provided with data regarding the amount of angular rotation of the pulley 33 that is required to move a first location E on the surface of the conveyor belt 29 at a first edge 43 of the view of the camera 35 to a location F adjacent to the opening 15. The processor of the controller 37 furthermore is provided with data regarding the amount of angular rotation of the pulley 33 that is required to move a second location G on the surface of the conveyor belt 29 at a second edge 45 of the view of the camera 35 to a location F adjacent to the opening 15. Through analysis of images received from the camera 35, the processor of the controller 37 is configured to determine the location H of the seed 1 relative to the locations E and G. The processor is configured to calculate based on the above referenced data on the movement of locations E and F and based on the determined location H of the seed 1 relative to the locations E and G, the amount of angular rotation of the pulley 33 that is required to move the location H of the seed 1 on the surface of the conveyor belt 29 to the location F adjacent to the opening 15. The processor is configured to determine based on the angular rotation of the pulley 33 sensed by means of the angular rotation sensor 41 when the location H of the seed 1 has arrived at the location F adjacent to the opening 15. When it is determined that the location H of the seed 1 has arrived at the location F adjacent to the opening 15, as shown in FIG. 10, the processor is configured to control the selectively operable valve 19 such that the valve 19 is opened and fluid 21 is supplied to nozzle 17 for directing the fluid 21 over the conveyor surface 3 in the direction of the opening 15. As a result the seed 1 is flushed into the opening 15 and guided into the tray compartment 9 as schematically illustrated by means of arrow I and as described herein above under reference to FIGS. 1 to 4. After the seed 1 is sown into the tray compartment 9, the tray compartment 9 is moved in the direction of arrow A and a second tray compartment 25 that is attached thereto is arranged underneath the outlet opening 23 of the guide channel 7. In an advantageous embodiment the processor is configured to store an image of each seed that is detected together with information on whether or not the seed was selected to be flushed into an opening. Also information is advantageously stored regarding the tray compartment in which each selected seed is sown.

Figure 11:
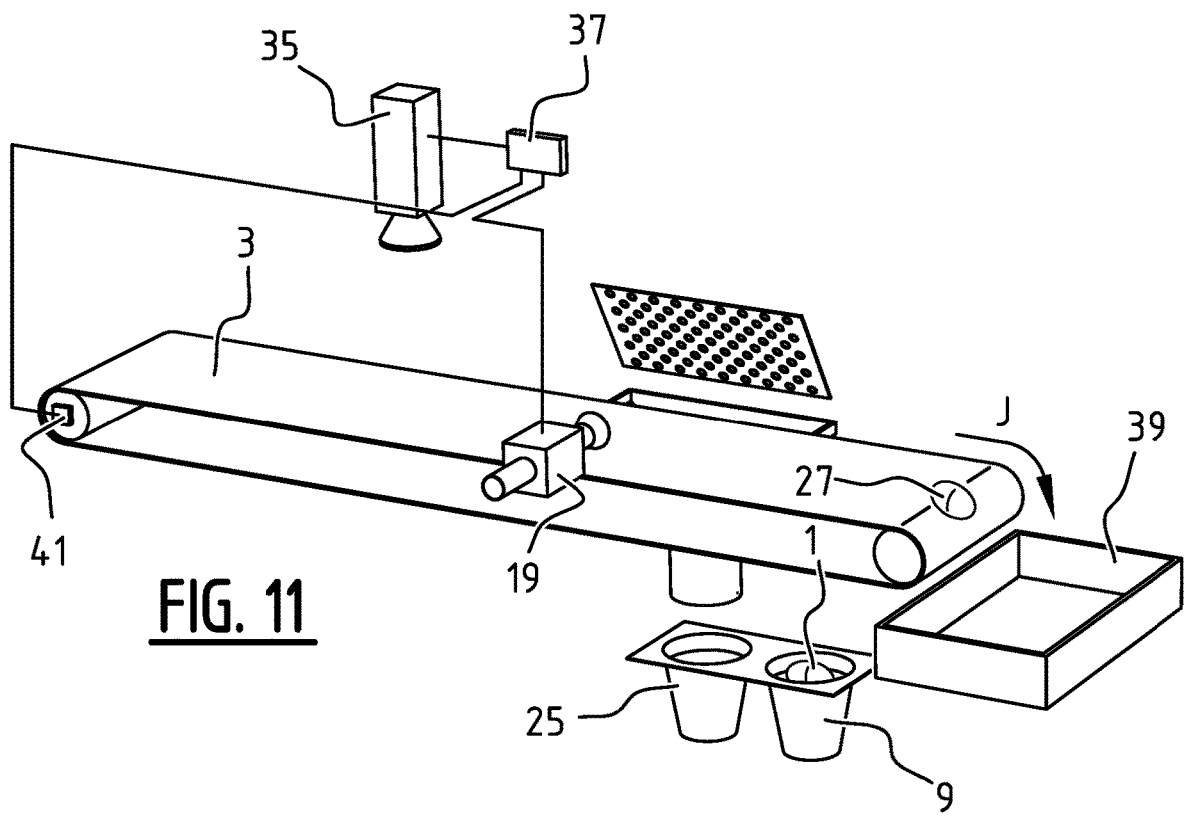

While seed 1 is conveyed along the opening 15, the second seed 27 is conveyed along camera 35. Analogous to what is described herein above under reference to FIG. 9, the processor of the controller 37 detects the second seed 27 on the images received from the camera 35 while the second seed 27 is conveyed along the camera 35, and determines a selection characteristic of the seed 27, for instance the shape of the seed 27. The processor determines whether the determined selection characteristic meets the selection criteria. In the present case it is determined by the processor that second seed 27 does not meet the selection criteria, and thus second seed 27 is not selected by the processor to be flushed into the opening 5. As a result of not being selected for flushing into the opening 5, the second seed 27 is conveyed along the opening 5 without being flushed into opening 5. As shown in FIG. 11, at the end of the path P of the conveyor belt 29, the second seed 27 falls into the receptacle 39.

Figure 12:
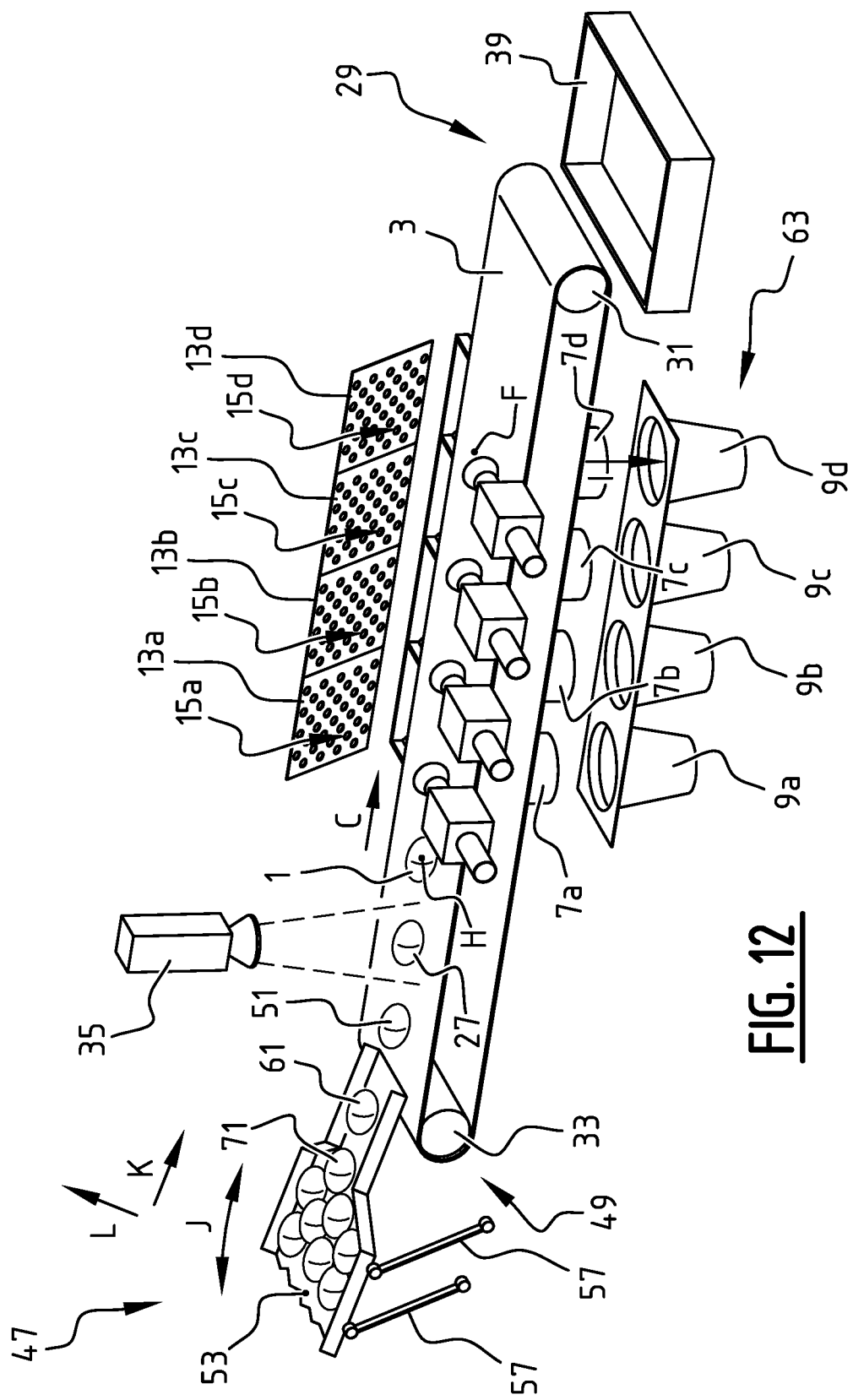
FIGS. 12 and 13 illustrate an embodiment of the method and seeder according to the invention that is an advantageous further development of the embodiment illustrated by FIGS. 7 to 11.
Figure 13:
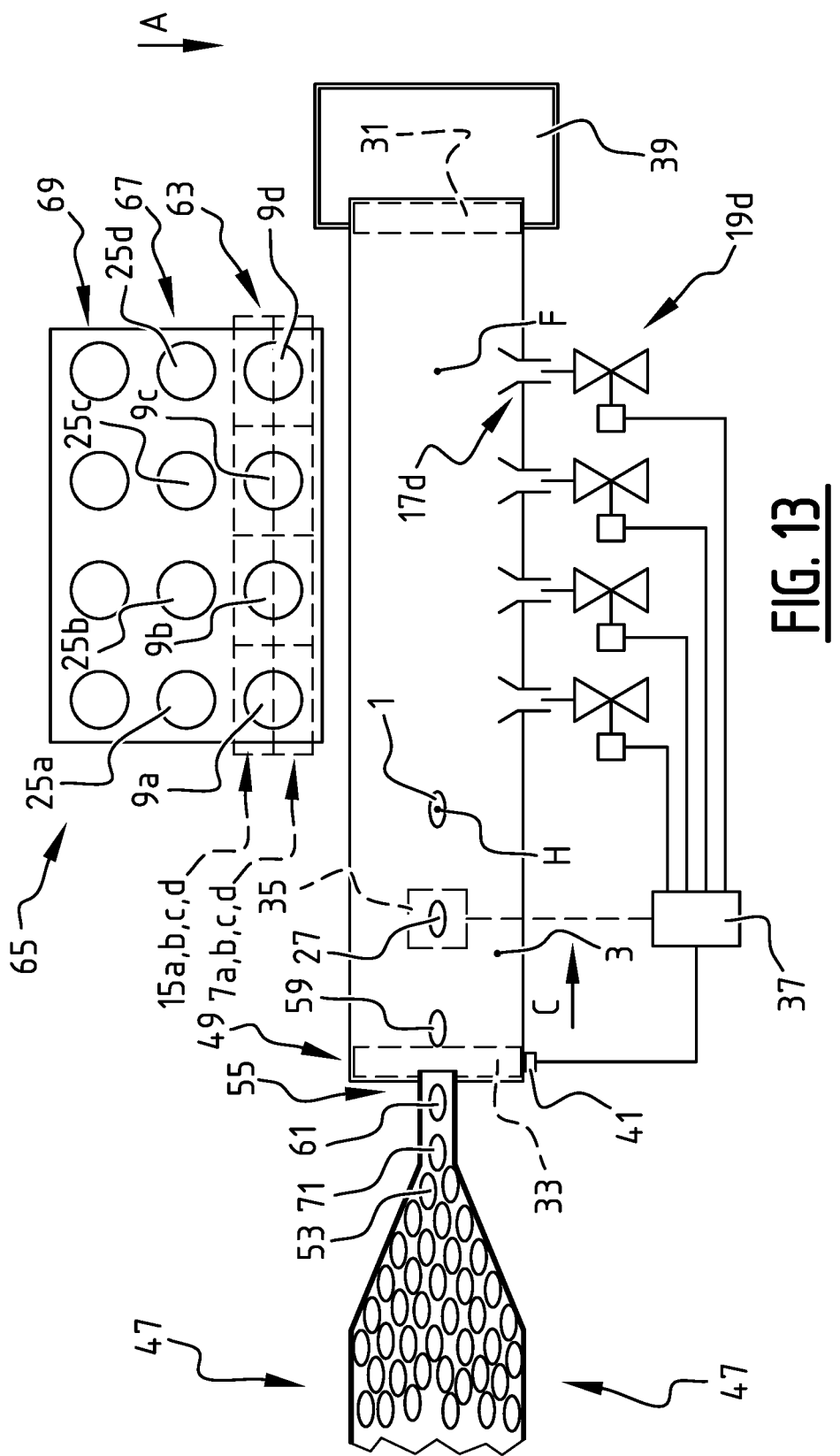

In FIGS. 12 and 13 an embodiment of the method and seeder according to the invention is shown that is an advantageous further development of the embodiment illustrated by FIGS. 7 to 11. As shown in FIGS. 12 and 13, a shaker conveyor 47 is arranged at the front end 49 of the conveyor belt 29. The shaker conveyor 47 debouches on the conveyor surface 3. The shaker conveyor 47 is configured to convey a batch 51 of seeds that is arranged on a shaker surface 53 thereof to the end 55 of the shaker conveyor 47 where the shaker conveyor 47 debouches on the conveyor surface 3. The shaker surface 53 is mounted on a row of spring elements 57 and is driven by a drive (not shown) such that a shaking movement of the shaker surface 53 is generated that is schematically illustrated by means of the double arrow J. The shaking movement J causes a forward movement of the seeds arranged on the shaker surface 53 parallel to the shaker surface 53 schematically illustrated by means of arrow K and the upward movement of the seeds arranged on the shaker surface 53 perpendicular to the shaker surface 53 schematically illustrated by means of arrow L. The upward movement L causes seeds that are arrange on top of each other to move way from each other. The forward movement K conveys the seeds towards the end 55 of the shaker conveyor 47. As shown in FIG. 13, the shaker surface 53 tapers towards the end 55 of the shaker conveyor 47 such that the batch 51 of seeds is channeled into a flow of seeds that debouches on the conveyor surface 3 in single file. The shaker movement is set such that the forward movement K of the seeds that debouch on the conveyor surface 3 is lower than the speed of the conveyor belt 29 in the direction of arrow C. As a result a row of individualized seeds 1, 27, 59 is arranged on the conveyor surface 3 and conveyed along the path P in the direction of arrow C along camera 35. As shown in FIGS. 12 and 13 a fourth seed 61 is about to be arranged on the conveyor surface. Analogous to what is described under reference to FIGS. 7 to 11, each seed of the row of seeds is identified by the processor of the controller 37 that is connected to camera 35. For each seed that is conveyed along the camera a selection characteristic is determined by the processor and for each seed the processor determines whether or not the seed meets the selection criteria and is selected to be flushed in the opening 5. In the shown embodiment, four openings 5a-d are arranged along the path P. Each of the openings 5a-d leads to a respective guide channel 7a-d that extends to a respective seed location embodied by a respective tray compartment 9a-d. In case the processor determines that a seed that is conveyed along the camera 35 meets the selection criteria, the processor selects one of the openings 5a-d as the opening to flush the seed into. Analogous to what is described under reference to FIGS. 9 and 10, the processor determines the location of the seed on the conveyor surface 3 and determines when the seed is adjacent to the opening that is selected to flush the seed in. In the shown embodiment opening 5d is selected by the processor to flush seed 1 in. Thus analogous to what is described under reference to FIGS. 9 and 10, when it is determined by the processor that the location H of the seed on the conveyor surface 3 is at location F of the opening 5d, the processor controls the selectively operable valve 19d such that the valve 19d is opened and fluid is supplied to nozzle 17d for directing the fluid over the conveyor surface 3 in the direction of the opening 5d. The seed 1 is then flushed into the opening 5d and guided by means of guide channel 7d into the tray compartment 9d as schematically illustrated by means of arrow I. Analogous to what is noted under reference to FIG. 1, side walls that serve as side borders of the openings 5a, 5b. 5c, 5d preferably extend from opposite sides of each of the slanted walls 13 towards the surface 3. In FIG. 12 such side walls are not shown. Such side walls provide a separation between neighbouring openings 5, thereby preventing a seed to be flushed not into the selected opening but into a neighbouring opening.

As shown in FIGS. 12 and 13 a row 63 of tray compartments 9a-d is arranged under the guide channels 7a-7d, each tray compartment 9a-d is arranged under a respective guide channel 7a-7d. In case each of the first four shown seeds 1, 27, 59, 61 is selected to be flushed into an opening, the processor of the controller 37 selects for each of the selected seeds 1, 27, 59, 61 a respective one of the openings 15a-d, such that one seed is sown into each one of the tray compartments 9a-d. As shown in FIG. 13 the row 63 of tray compartments 9a-9d is one row of a seed tray 65 having a plurality of parallel rows 63, 67, 69 of tray compartments. Once all tray compartments 9a-9d of the row 63 have arranged therein one seed, the seed tray 65 is moved by means of a linear conveyor (not shown) on which the seed tray is arranged in the direction of arrow A, such that a next row 67 with tray compartments 25a-d is arranged under the guide channels 7a-7d, wherein each tray compartment 25a-d is arranged under a respective guide channel 7a-7d. Subsequently, analogous to the sowing of seeds 1, 27, 59, 61 in tray compartments 9a-d, in each of the compartments 25a-d, a seed is sown that is selected from the continuous flow of individual seeds that is arranged on conveyor surface 3. Once all tray compartments 25a-d of the row 67 have arranged therein one seed, the seed tray 65 is again moved by means of the linear conveyor (not shown) on which the seed tray is arranged in the direction of arrow A, such that a next row 69 with tray compartments is arranged under the guide channels 7*a*-7*d*, wherein each tray compartment of row 69 is arranged under a respective guide channel 7*a*-7*d*. Subsequently, in each tray compartment of row 69, a seed is sown that is selected from the continuous flow of individual seeds that is arranged on conveyor surface 3.

In a preferred embodiment, starting from the situation shown in FIGS. 12 and 13, opening 5*d* is selected for seed 1, opening 5*c* is selected for seed 27, opening 5*b* is selected for seed 59, and opening 5*a* is selected for seed 61. In that case the next seed 71 of the continuous row of seeds that is arranged on the conveyor surface 3, which seed 71 is in FIGS. 12 and 13 arranged on the shaker surface 53, will be located where seed 1 is located in the situation shown in FIGS. 12 and 13, once seeds 1, 27, 59, and 61 are flushed into the tray compartments 9*a*-*d*. Then the time that it takes for the conveyor belt 29 to convey seed 71 to the location f of the opening 5*d* is available for moving seed tray 65 in the direction of arrow A such that the tray compartments 25*a*-*d* of the row 67 are arranged underneath the guide channels 7*a*-*d*. This allows the conveyor belt 29 to be continuously driven. It is noted, that it is for instance possible that the time that is required to move seed tray 65 in the direction of arrow A such that the tray compartments 25*a*-*d* of the row 67 are arranged underneath the guide channels 7*a*-*d*, is shorter than the time that it takes for the conveyor belt 29 to convey a seed from the location H of seed 1 shown in FIGS. 12 and 13 to location F of the opening 5*d*. In that case openings 5*a*-*d* may be selected in another sequence by the processor for subsequent seeds of the continuous row of seeds without having to stop or slow the conveyor belt 29 in order to move seed tray 65 in the direction of arrow A such that the tray compartments of a subsequent row are arranged underneath the guide channels 7*a*-*d*.

Analogous to what is described under reference to FIGS. 7 to 11, in case a determined selection characteristic of a seed of the continuous row of seed that is arranged on the conveyor surface 3 does not meet the selection criteria, the processor of the controller 37 does not select the seed for flushing into one of the openings and allows the seed to fall into the receptacle 39 at the end of path P.

Figure 14:
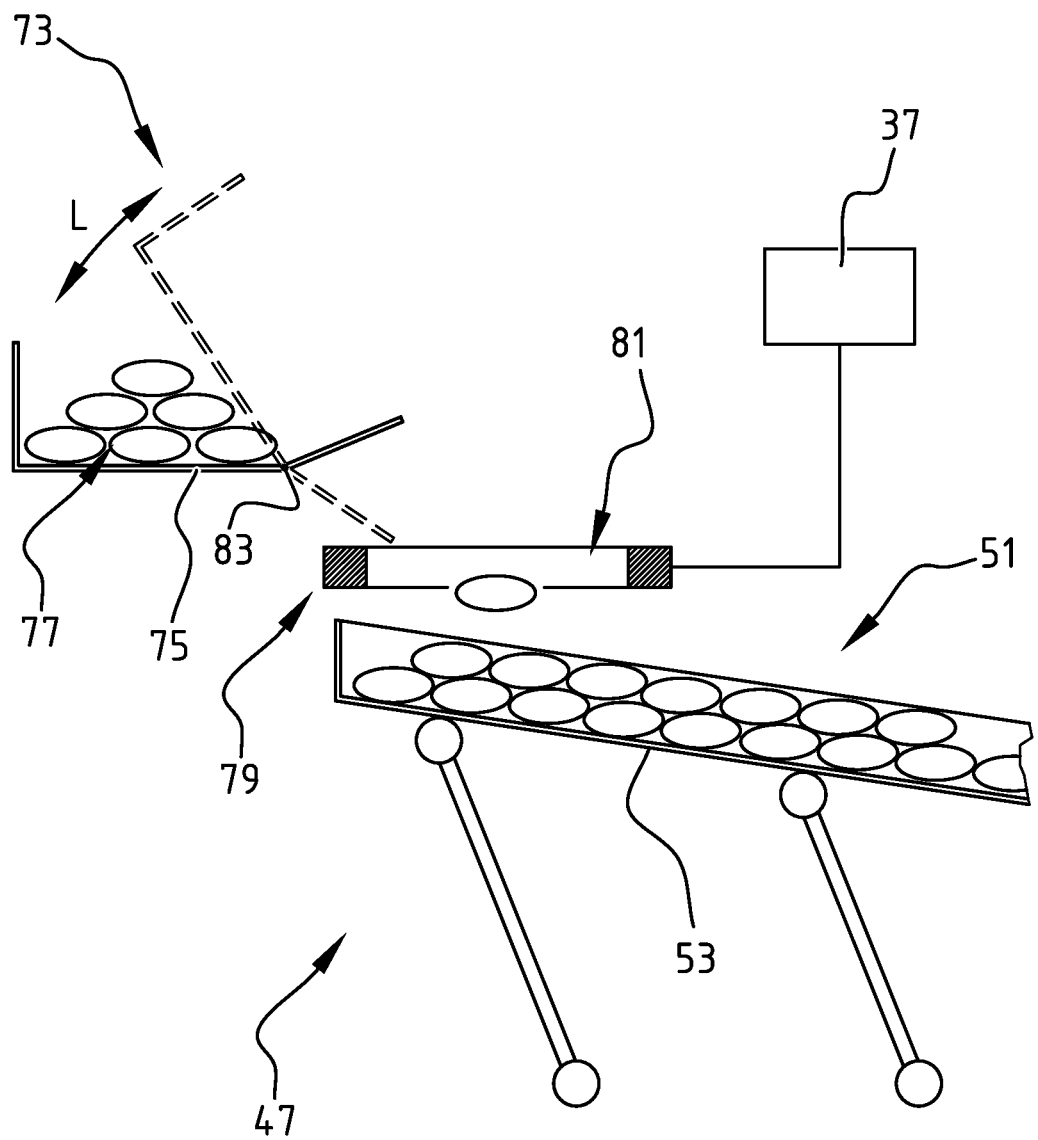
FIG. 14 shows a first embodiment of a seed distributor that is arranged above the shaker conveyor 47 shown in FIGS. 12 and 13.

In FIG. 14 a first embodiment is shown of a seed distributor 73 that is configured for batch wise distributing seeds to the shaker conveyor 47. The seed distributor is arranged above the shaker conveyor 47 of FIGS. 12 and 13. The seed distributor 73 has a container 75 that, as schematically illustrated by means of double arrow L is selectively tiltable around tilting axis 83. The container 75 is selectively tiltable by means of a mechanism (not shown) that is controlled by the controller 37. As shown in FIG. 14, the container 75 holds seeds 77. By tilting the container 75, a plurality of the seeds held in the container 75 are batch wise arranged on the shaker conveyor surface 53, such that a batch 51 of seeds is arranged on the shaker conveyor 53 that, as described herein above under reference to FIGS. 12 and 13, is channeled into the flow of seeds that debouches on the conveyor surface 3 in single file. The controller 37 is connected to the seed distributor 73 and configured to selectively tilt the container 75 when a batch of seeds is to be arranged on the shaker surface 53. As shown in FIG. 14, a seed counter 79 is arranged such that the seeds that fall out of the container 75 when the container 75 is tilted pass the seed counter 79. In the shown embodiment the seed counter 79 has an opening 81 through which the seeds pass when falling out of the container 75. Along the circumference of the opening 81 light sources and cooperating light sensors are arranged that allow for detecting a single seed that passes the opening 81. The seed counter 79 is configured to provide the controller 37 with data on the number of seeds that have passed the seed counter 79. On the basis of the number of seeds that have passed the seed counter 79 and on the basis of data on the number of seeds that have passed the camera 35, the controller 37 is configured to determine at least an indication of the number of seeds that is arranged on the shaker conveyor 47. Based on the determined number of seeds that is arranged on the shaker conveyor 47, the controller 37 is configured to control the tilting of the container 75 in order to ensure that a proper amount of seeds is arranged on the shaker conveyor 47 to enable proper execution of the sowing process. Both underfilling and overfilling of the shaker conveyor 47 may result in the shaker conveyor to stop functioning or to deliver a flow of seeds on the conveyor surface 3 with a flow velocity that is unsuitable for providing on the conveyor surface 3 a row of individualised seeds. In order to distribute small batches of seeds to the shaker conveyor, the controller 37 is advantageously configured to tilt the container 75 and shake seeds out of the container 75 by generating an oscillating tilting motion with a relatively small angular movement around the tilting axis 83. The seed container 75 is in an advantageous embodiment arranged on a carrousel on which a plurality of seed containers can be arranged. This makes it possible after sowing seeds from a first container into the tray compartments of a seed tray, to sow seeds from another seed container into the tray compartments of a subsequent seed tray, by rotating the carrousel such that the other seed container is arranged above the shaker surface 53 of the shaker conveyor 47 and by subsequently tilting the other seed container in order to distribute seeds to the shaker surface 53. In case the seeds of the other seed container are of another type, and seeds of the previous type are still arranged on the shaker surface 53 or on the conveyor surface 3, the seeds of the previous type are first conveyed to the receptacle 39 at the end of path P of the conveyor 29 before the seeds of the other type are distributed to the shaker conveyor. In an advantageous embodiment a system is provided for removing seeds from the receptacle 39.

Figure 15:
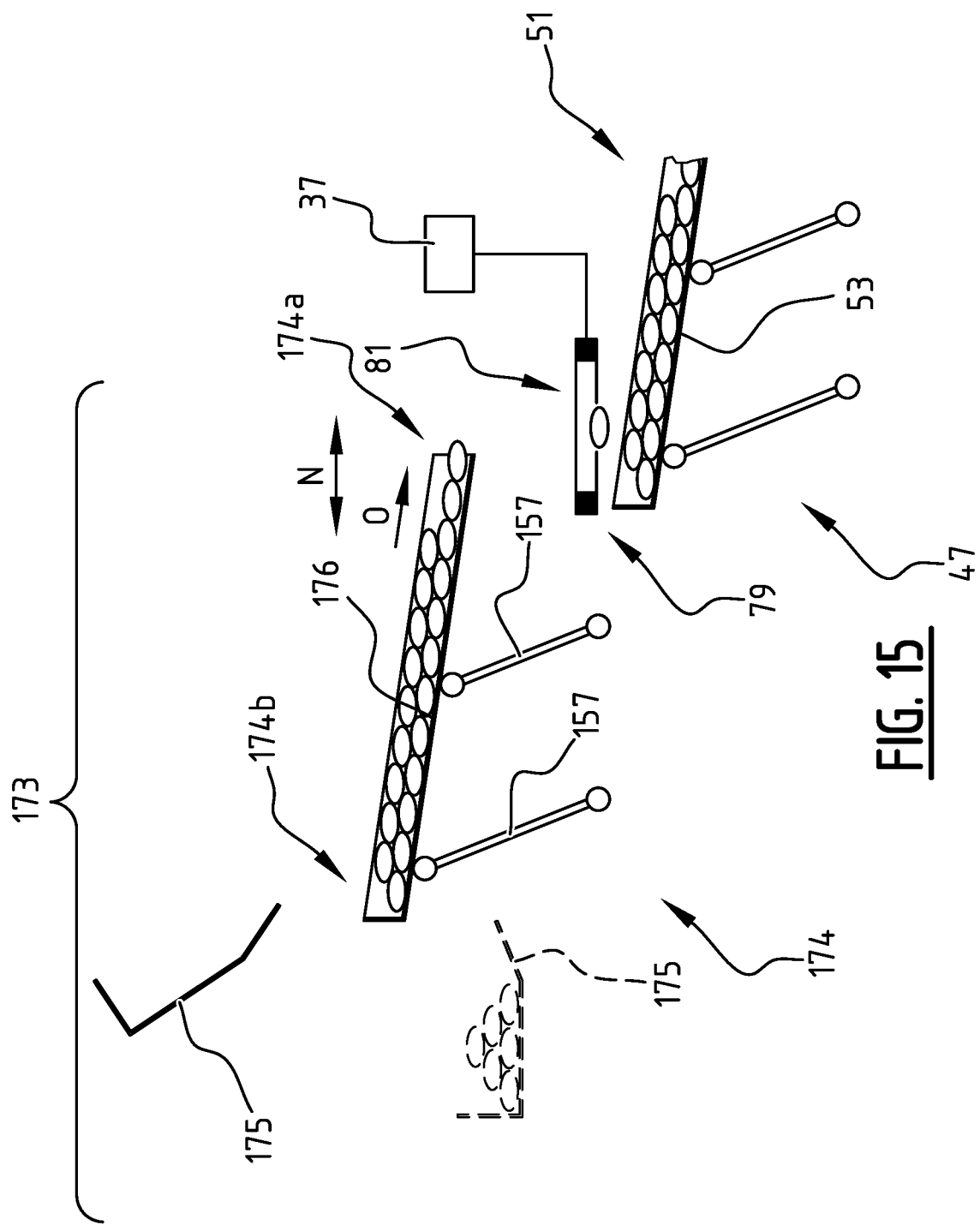
FIGS. 15 to 17 show a second embodiment of a seed distributor that is arranged above the shaker conveyor 47 shown in FIGS. 12 and 13 in different phases of the operation thereof.
Figure 16:
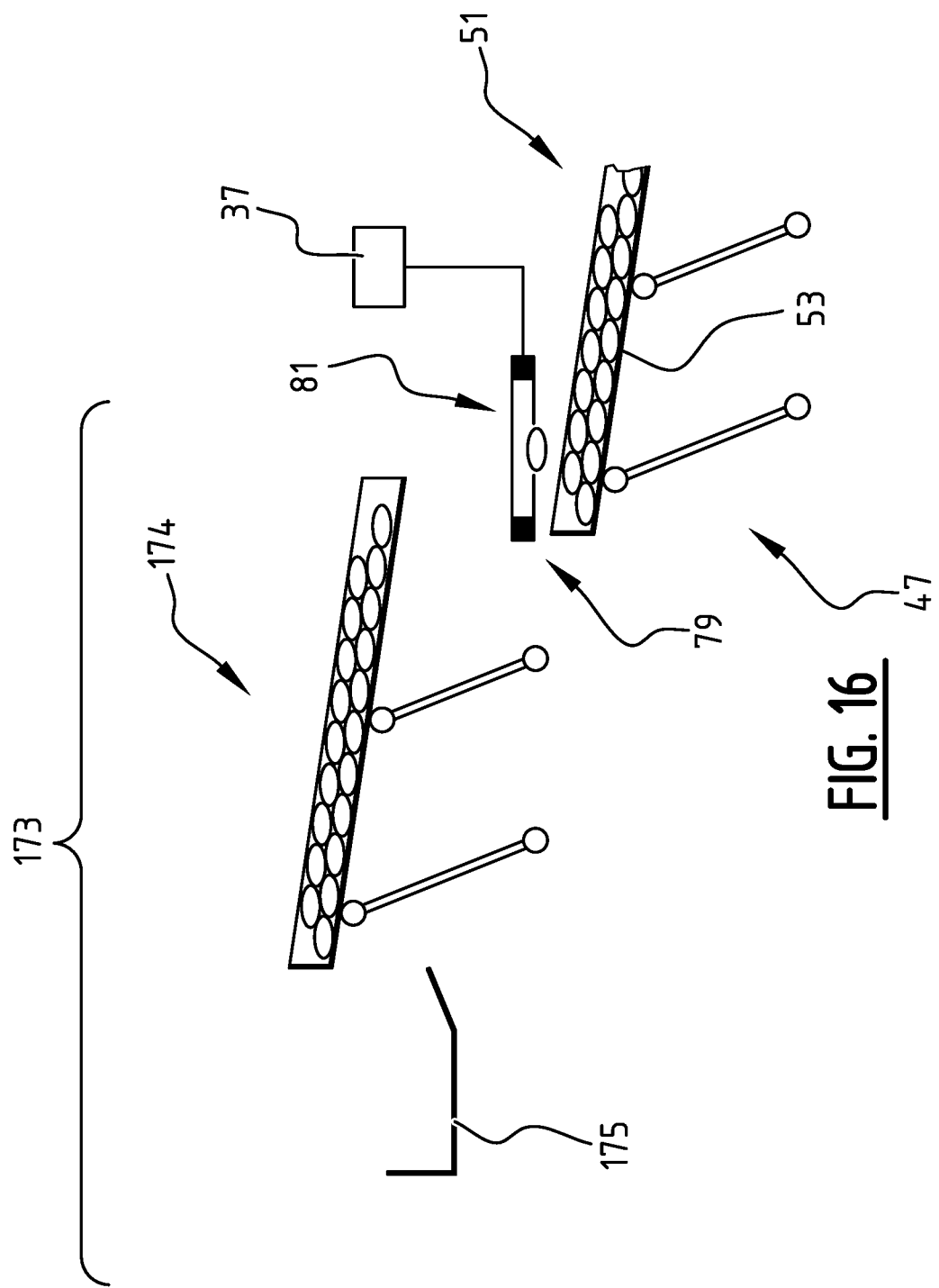
Figure 17:
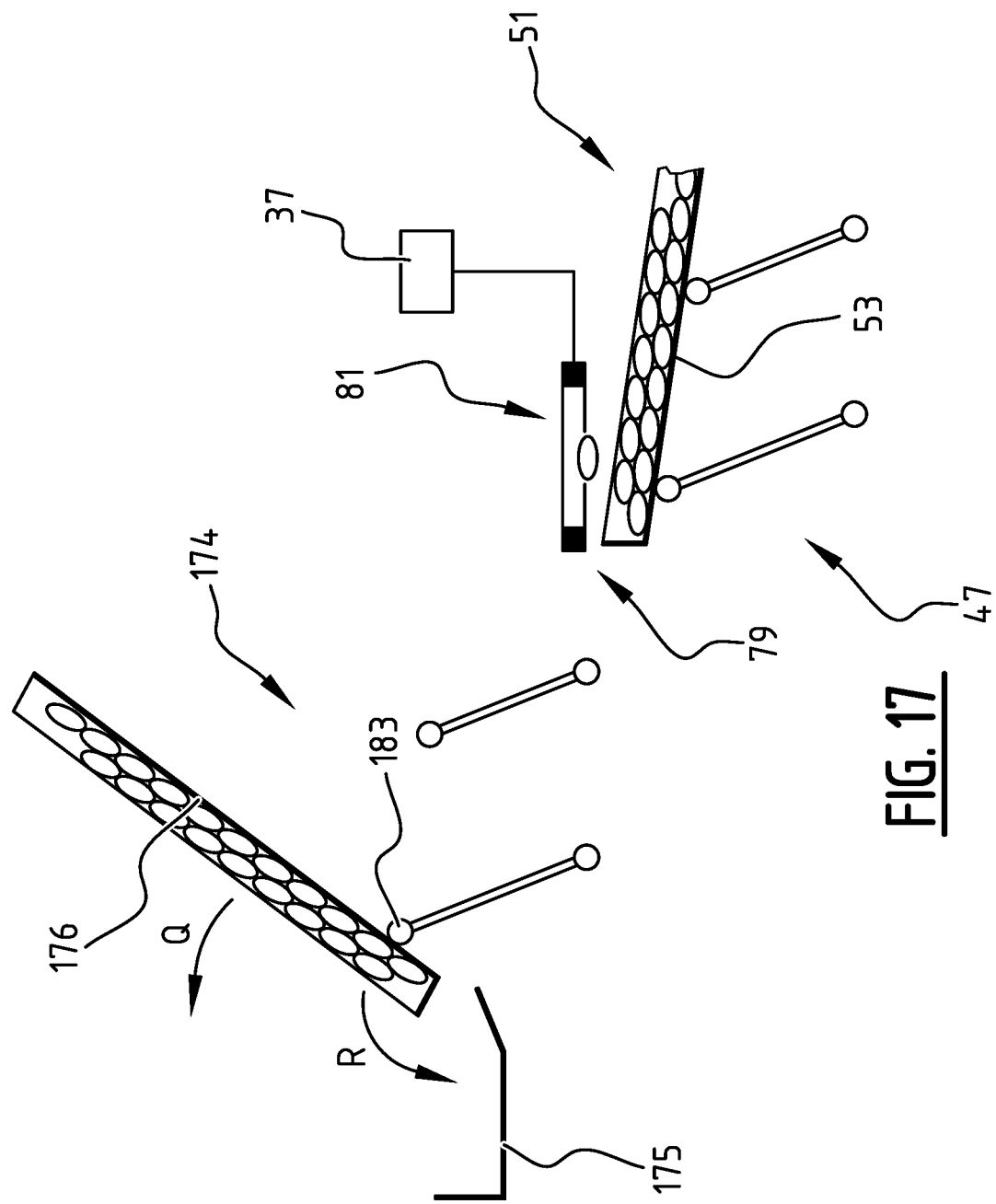

In FIGS. 15 to 17 a second embodiment is shown of a seed distributor 173 that is configured for batch wise distributing seeds to the first shaker conveyor 47. The seed distributor 173 has a second shaker conveyor 174 having an first end 174*a* arranged above the surface 53 of the first shaker conveyor 47 of FIGS. 12 and 13. The seed distributor 173 furthermore includes a container 175. The container 175 is selectively tiltable between a first position and a second position. The container 175 is selectively tiltable by means of a mechanism (not shown) that is controlled by the controller 37. In FIG. 14 is shown that the container 175 has been tilted from the first position (indicated with dashes) into a second position above a second end 174*b* of the second shaker conveyor 174, such that all the seeds that were held in the container 175 have been arranged on the surface 176 of the second shaker conveyor 174. The shaker surface 176 is mounted on a row of spring elements 157 and is driven by a drive (not shown) controller by controller 37. The second shaker conveyor 174 is configured such that a shaking movement of the shaker surface 176, schematically illustrated by means of the double arrow N, can be generated by means of the drive. Once the seeds have been arranged on the shaker surface 176 of the second shaker conveyor 174, the controller 37 can control the drive such that the shaking movement of the shaker surface 176 is generated. The shaking movement N causes a forward movement of the seeds arranged on the shaker surface 176 parallel to the shaker surface 176 schematically illustrated by means of arrow O. The forward movement O conveys the seeds towards the first end 174*a* of the second shaker conveyor 174. At the first end 174*a*, the seeds fall down onto the surface 53 of the first shaker conveyor 47. As shown in FIG. 15, a seed counter 79 is arranged such that the seeds that fall from the shaker surface 176 pass the seed counter 79. In the shown embodiment the seed counter 79 has an opening 81 through which the seeds pass. Along the circumference of the opening 81 light sources and cooperating light sensors are arranged that allow for detecting a single seed that passes the opening 81. The seed counter 79 is configured to provide the controller 37 with data on the number of seeds that have passed the seed counter 79. On the basis of the number of seeds that have passed the seed counter 79 and on the basis of data on the number of seeds that have passed the camera 35, the controller 37 is configured to determine at least an indication of the number of seeds that is arranged on the first shaker conveyor 47. Based on the determined number of seeds that is thus arranged on the first shaker conveyor 47, the controller 37 is configured to control the shaking movement of the shaker surface 176 of the second shaker conveyor 174 in order to ensure that a proper amount of seeds is arranged on the shaker surface 53 of the first shaker conveyor 47 to enable proper execution of the sowing process. Both underfilling and overfilling of the shaker conveyor 47 may result in the shaker conveyor to stop functioning or to deliver a flow of seeds on the conveyor surface 3 with a flow velocity that is unsuitable for providing on the conveyor surface 3 a row of individualised seeds. The controller 37 is advantageously configured to stop the shaking movement of the shaker surface 176 before the number of seeds that is arranged on the first shaker conveyor 47 is such that overfilling occurs and to start the shaking movement of the shaker surface 176 again before underfilling occurs.

As shown in FIG. 16, the empty container 175 can be tilted into its first position while the second shaker conveyor 174 is operated to distribute seeds to the first shaker conveyor 47.

The shaker surface 176 of the second shaker conveyor 174 can be tilted about a tilt axis 183 in the direction of arrow Q from the position shown in FIGS. 15 and 16 into a position shown in FIG. 17. This allows to return seeds that are arranged on the shaker surface 176 of the second shaker conveyor 174 into the empty container 175 in the direction of arrow R. The seeds are for instance returned into the container 175 when the sowing of seeds in a seed tray is finished and another type of seeds is to be sown in a subsequent seed tray.

The seed container 175 is in an advantageous embodiment arranged on a carrousel on which a plurality of seed containers can be arranged. This makes it possible after sowing seeds from a first container into the tray compartments of a seed tray, to sow seeds from another seed container into the tray compartments of a subsequent seed tray. To that effect, after returning the seeds into the first container 175, the carrousel is rotated such that the other seed container is arranged at the second shaker conveyor 174. Subsequently the steps described herein above under reference to FIG. 15 are repeated in order to distribute seeds held in the other container to the shaker conveyor 47.

The seed distributor 173 shown in FIGS. 15 to 17 allows for all the seeds held in a container 175 to be arranged on the second shaker conveyor 174 before distributing seeds to the first shaker conveyor 47. This has the advantage that the distribution is less selective relative to distribution with the seed distributor 73 shown in FIG. 14 where seed is distributed directly from the container 75. Being less selective is in particular relevant when the method and seeder according to the invention are used to sow a representative sample of a batch of seeds.

In FIG. 18 an embodiment of the method and seeder according to the invention is shown that is an advantageous further development of the embodiment illustrated by FIGS. 12 an 13. In the shown embodiment openings 5*a*, 5*b*, 5*c*, and 5*d*, are arranged along a first longitudinal edge 85 of the conveyor belt 28, which first edge extends parallel to the path P of the conveyor belt 29. Furthermore, along the second longitudinal edge 86 opposite to the first edge 85 four additional openings 87*a*, 87*b*, 87*c*, 87*d*, are arranged opposite the openings 5*a*, 5*b*, 5*c*, and 5*d*. As shown in FIG. 15, the nozzles 17*a*-*d* that are associated with the openings 5*a*-*d* are arranged above the conveyor surface in between the opposite longitudinal edges 85, 86. Also arranged above the conveyor surface in between the opposite longitudinal edges 85, 86 are nozzles 89*a*-*d* that associated with the openings 87*a*-*d*. Each of the nozzles 89*a*-*d* is associated with and directed to a respective one of the openings 87*a*-*d*. Each of the nozzles 17*a*-*d* and 89*a*-*d* is selectively operable to direct a fluid over the conveyor surface 3 in the direction of the opening associated therewith.

As shown in FIG. 18 the shaker conveyor 91 is configured to channel the batch of seeds 51 arranged on the shaker surface 93 into two flows of seeds 95, 97 debouching on opposite sides of the nozzles 17*a*-*d* and 89*a*-*d* that are arranged above the conveyor surface 3 in between the longitudinal edges 85, 86. Each of the two flows of seeds 95, 97 that debouche on the conveyor surface 3 results, analogous to what is described under reference to FIGS. 12 to 14, in a continuous row of individualised seeds that is arranged on the conveyor surface 3. The first row is schematically illustrated by means of axis 99 and extends in between the openings 5*a*-*d* and the nozzles 17*a*-*d* associated therewith. The second row is schematically illustrated by means of axis 101 and extends in between the openings 87*a*-*d* and the nozzles 89*a*-*d* associated therewith. While, analogous to what is described under reference to FIGS. 12 and 13, the openings 5*a*-*d* lead to respective guide channels under which a row of respective tray compartments can be arranged, the openings 87*a*-*d* lead to respective guide channels under which another row of respective tray compartments can be arranged. Thus in the embodiment shown in FIG. 16, two rows of tray compartments of a seed tray can be sown before having to move the seed tray to arrange a subsequent row of compartments to be sown underneath the outlet openings of the guide channels. Both rows of seeds pass the camera 35 that is arranged above the conveyor surface 3. The processor of the controller 37 is configures to analyse the images received from the camera 35 and to detect individual seeds of each of the rows passing the camera 35.

In FIG. 19 a seed tray 65 is shown that is arranged underneath the conveyor belt 29 of the embodiment shown in FIG. 16. The seed tray 65 has four rows 63, 67, 69, 103 of tray compartments, wherein in FIG. 16 row 103 is arranged underneath the outlet openings 23*a*-*d* that are associated with the openings 5*a*-*d* and row 69 is arranged underneath the outlet openings 105*a*-*d* that are associated with the openings 87*a*-*d*. In the tray compartments of row 63 and 67 seeds have already been sown. A second camera 107 is arranged above the path along which the seed tray 65 is moved in the direction of arrow A, such that each of the rows of the seed tray 65 pass underneath the second camera 107 after the tray compartments thereof have passed the outlet openings 23*a-d* and 105*a-d* of the guide channels. The second camera 107 is connected to the controller 37. The processor is configured to analyse the images received from the second camera 107. The processor is configured to detect in which of the tray compartments of the row passing underneath the second camera 107 have arranged a seed therein. The processor is furthermore configured to determine whether each of the tray compartments passing underneath the second camera 107 that according to data regarding the sowing should have a seed arranged therein, indeed has arranged a seed therein. The result is logged and/or the operator of the seeder is informed of the result, such that the operator can decide in case of any discrepancy how to respond. The operation could for instance in case of a missing seed in one of the tray compartments seed a seed in the tray compartment by hand. It is also possible that the processor 37 is configured to respond to any discrepancy by moving the seed tray 65 back in the direction of arrow S until the tray compartment that has no seed arranged therein is underneath one of the outlet openings 23*a-d* and 105*a-d* and subsequently seed a seed in that tray compartment. The feature of the second camera 107 can also advantageously be applied in the embodiments of the method and seeder shown in any of the FIGS. 1 to 13. Both embodiments of the seed distributor shown in FIGS. 14 to 17 may be used to distribute seed to the shaker conveyor 91 of the embodiment shown in FIGS. 18 and 19.

Although the embodiments of the method and seeder according to the invention described herein above are in particular suitable for sowing seeds in tray compartments of a seed tray, equivalent embodiments are advantageously used for sowing seeds in other seed locations. In stead of tray compartments of a seed tray, compartments of other single- or multi-compartment receptacles, for instance compartments of a microtiter plate, may be filled with seeds by means of embodiments of the method and seeder according to the invention. In order to adapt the embodiments of the seeder according to the invention shown in FIGS. 1 to 19 to other single- or multi-compartment receptacles, the guide channels are advantageously replaced with guide channels that extend to another seed location.

By advantageously modifying the described embodiments such that in stead of tray compartments are arranged and/or moved underneath the outlet opening(s) of the guide channel (s), the outlet opening(s) of the guide channel(s) are arranged and/or moved above a location in a field, embodiments of the method and seeder according to the invention can be used to sow seed in the open field.

The general steps of a method according to the invention shown in FIGS. 1 to 3, as well as the general components of a seeder according to the invention shown in FIGS. 1 to 3, may also be applied in combination with a stationary surface on which the seed is arranged. By, for example, providing a second nozzle that is arranged for directing fluid supplied thereto over the surface in a direction away from the opening, the seed can be sowed in the seed location associated with the opening by directing fluid over the surface in the direction of the opening by means of the first nozzle or be conveyed to another location by directing fluid over the surface in the direction away from the opening by means of the second nozzle. It would for instance be possible to provide a second opening that leads to a second guide channel that extends to a second seed location, such that a seed that is arranged on the stationary surface can be selectively flushed into the first opening for sowing the seed in the first seed location or into the second opening for sowing the seed in the second seed location.

Although the principles of the invention have been set forth above with reference to specific embodiments, it must be understood that this description is given solely by way of example and not as limitation to the scope of protection, which is defined by the appended claims.

The invention claimed is:

1. A method for sowing an individual seed in a seed location, comprising:
    providing a surface, wherein the surface is a conveyor surface of a conveyor belt led over pulleys;
    providing an angular rotation sensor configured to sense angular rotation of one of the pulleys;
    providing at least one location sensor, wherein the at least one location sensor is configured to capture images;
    providing a controller, wherein the controller is operably coupled to the angular rotation sensor and the at least one location sensor;
    arranging a seed on the surface adjacent to an opening that leads to a guide channel that extends to the seed location;
    flushing the seed from the surface into the opening by directing a fluid over the surface in the direction of the opening; and
    guiding the seed that is flushed into the opening to the seed location by means of the guide channel,
    wherein:
    the seed is conveyed along the opening on the conveyor surface in a conveying direction;
    the fluid is directed transverse to the conveying direction;
    the controller determines the location of the seed relative to the conveyor surface using the at least one location sensor based on analysis of images received from the at least one location sensor and associates the determined location of the seed relative to the conveyor surface with the location of the conveyor surface relative to the location of the opening;
    the controller determines an amount of angular rotation of the one of the pulleys that is needed to move the seed from the location determined from the analysis of images received from the at least one location sensor to a location adjacent to the opening;
    the controller determines, based on the angular rotation of the pulley sensed by means of the angular rotation sensor, when the seed is adjacent to the opening; and
    the seed is flushed into the opening when it is determined that the seed is adjacent to the opening.

2. The method according to claim 1,
    wherein
    the surface is a substantially flat horizontal surface.

3. The method according to claim 1,
    wherein
    the seed is flushed over the surface in the direction of the opening by directing the fluid over the surface in the direction of the opening.

4. The method according to claim 1,
    wherein
    the opening in which the seed is flushed is a selected one of a plurality of openings arranged along the conveyor surface, wherein each opening leads to a respective guide channel that extends to a respective seed location.

5. The method according to claim 4,
    wherein
    the seed is conveyed on the conveyor surface along the plurality of openings in a conveying direction; and the plurality of openings are arranged in a row that extends parallel to the conveying direction.

6. The method according to claim 4, wherein the plurality of seeds are arranged in a row of individual seeds on the surface and conveyed along the opening on or over the surface in a direction parallel to the row.

7. The method according to claim 6, wherein the seeds are arranged in a row of individual seeds on the surface by:
moving the surface with a conveying speed; and
arranging a batch of seeds on a shaker conveyor that debouches on the surface, wherein the shaker conveyor is configured to channel the batch of seeds into a flow of seeds having a flow speed that is lower than the conveying speed of the surface.

8. The method according to claim 7, further comprising
counting the number of seeds in the batch of seeds that is arranged on the shaker conveyor.

9. The method according to claim 4, further comprising
determining a selection characteristic of each of the plurality of seeds that is arranged on the surface;
selecting the seed to be flushed into the opening at least based on the determined selection characteristic of the seed,
wherein
the selection characteristic of each of the plurality of seeds is determined using at least one selection sensor.

10. The method according to claim 9, wherein
the at least one selection sensor includes a camera; and
the selection characteristic is determined by analysing images of the seed on the surface obtained by means of the camera.

11. The method according to claim 1, wherein
the at least one location sensor includes a camera; and
the location of the seed on the surface is determined by analysing images of the seed on the surface obtained by means of the camera.

12. A seeder for sowing a seed in a seed location, comprising:
at least one opening that leads to a guide channel that extends to a seed location;
a surface that is configured to be arranged adjacent to the at least one opening, wherein the surface is a conveyor surface of a conveyor belt led over pulleys;
a selectively operable fluid supply for each opening, each fluid supply having at least one nozzle that is arranged for directing fluid supplied thereto over the surface in the direction of the opening;
an angular rotation sensor configured to sense angular rotation of one of the pulleys;
at least one location sensor, wherein the at least one location sensor is configured to capture images; and
a controller, wherein the controller is operably coupled to the angular rotation sensor and the at least one location sensor;
wherein:
the conveyor surface is configured to be moved along a path in a conveying direction;
the at least one opening is arranged adjacent to the path of the conveyor surface;
the at least one nozzle is arranged for directing the fluid supplied thereto over the surface transverse to the conveying direction;
the controller is configured to determine the location of the seed relative to the conveyor surface using the at least one location sensor based on the analyses of images received from the at least one location sensor and to associate the determined location of the seed relative to the conveyor surface with the location of the conveyor surface relative to the location of the opening;
the controller is configured to determine the amount of angular rotation of the one of the pulleys that is needed to move the seed from the location determined from the analysis of images received from the at least one location sensor to a location adjacent to the opening;
the controller is configured to determine, based on the angular rotation of the pulley sensed by means of the angular rotation sensor, when the seed is adjacent to the opening; and
the controller is configured to control the selectively operable fluid supply for the opening when it is determined that the seed is adjacent to the opening.

13. The seeder according to claim 12, further comprising:
a seed supply for arranging a seed on the surface.

14. The seeder according to claim 12, wherein
the surface is a substantially flat horizontal surface.

15. The seeder according to claim 12, wherein
a plurality of openings are arranged along the path of the conveyor surface, wherein each opening leads to a respective guide channel that extends to a respective seed location.

16. The seeder according to claim 15, wherein
the plurality of openings is arranged in at least one row that extends parallel to the conveying direction.

17. The seeder according to claim 15, wherein
the openings are arranged along opposite edges of the conveyor surface that are parallel to the path of the conveyor surface, and
the nozzles of the selectively operable fluid supplies associated with the openings are arranged above the conveyor surface in between the opposite edges.

18. The seeder according to claim 12, further comprising a seed supply for arranging a seed on the surface,
wherein the seed supply comprises:
a shaker conveyor that debouches on the conveyor surface, wherein the shaker conveyor is configured to channel a batch of seeds into a flow of seeds; and
a seed distributor configured for batch wise distributing seeds to the shaker conveyor.

19. The seeder according to claim 18, wherein
the shaker conveyor is configured to channel the batch of seeds into two flows of seeds debouching on opposite sides of the nozzles.

20. The seeder according to claim 18, wherein the seed supply comprises:
a seed counter arranged and configured for counting the number of seeds in the batch of seeds that is distributed to the shaker conveyor.

21. The seeder according to claim 12, wherein the seed location is a tray compartment of a seed tray; and
the seeder comprises a seed tray conveyor that is configured for arranging the tray compartment underneath an outlet of the guide channel.

\* \* \* \* \*